(12) United States Patent
Guo

(10) Patent No.: US 11,518,331 B2
(45) Date of Patent: Dec. 6, 2022

(54) CHILD SAFETY SEAT

(71) Applicant: Wonderland Switzerland AG, Steinhausen (CH)

(72) Inventor: Zheng-Wen Guo, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 183 days.

(21) Appl. No.: 17/016,354

(22) Filed: Sep. 9, 2020

(65) Prior Publication Data
US 2021/0070244 A1    Mar. 11, 2021

(30) Foreign Application Priority Data
Sep. 10, 2019 (CN) .......................... 201910855970.2

(51) Int. Cl.
*B60R 21/015* (2006.01)
*B60N 2/00* (2006.01)
*B60N 2/28* (2006.01)
*G08B 21/22* (2006.01)

(52) U.S. Cl.
CPC ........ *B60R 21/01556* (2014.10); *B60N 2/002* (2013.01); *B60N 2/2821* (2013.01); *G08B 21/22* (2013.01)

(58) Field of Classification Search
CPC ............ B60R 21/01556; B60N 2/2884; B60N 2/2887
See application file for complete search history.

(56) References Cited

U.S. PATENT DOCUMENTS

| 6,522,257 B1* | 2/2003 | Jakob ................... B60N 2/2806 200/85 A |
| 6,755,437 B2* | 6/2004 | Kraft ....................... B60N 2/28 280/801.1 |
| 7,168,738 B2* | 1/2007 | Garcia, Jr. ............. B60N 2/002 280/735 |
| 2005/0121956 A1 | 6/2005 | Dolan et al. |
| 2005/0280297 A1 | 12/2005 | Patterson et al. |

(Continued)

FOREIGN PATENT DOCUMENTS

| CN | 109 177 830 A | 1/2019 |
| DE | 44 18 028 A1 | 11/1995 |

OTHER PUBLICATIONS

European Search Report of the corresponding EP Patent Application No. 20195291.8 dated Feb. 10, 2021.

*Primary Examiner* — James A English
(74) *Attorney, Agent, or Firm* — NZ Carr Law Office PLLC

(57) ABSTRACT

A child safety seat includes a first and a second restraining device, and an alert device and a first and a second switch serially connected in a series circuit. Each of the first and second restraining device is deployable to engage with a corresponding structure provided in a vehicle, each of the first and second restraining devices being operable independently and having an idle position and a deployed position. The first and second switches are respectively coupled operatively to the first and second restraining device, and are respectively closed when the first restraining device is in the deployed position and the second restraining device in the idle position. The alert device is thereby activable to emit an alert signal when the first restraining device is in the deployed position and the second restraining device in the idle position.

17 Claims, 13 Drawing Sheets

(56) References Cited

U.S. PATENT DOCUMENTS

2008/0246316 A1\* 10/2008 Carine ................. B60N 2/2812
  297/217.2
2019/0176746 A1\* 6/2019 Chen ....................... B60R 22/28
2021/0229626 A1\* 7/2021 Demirovic .............. B60R 22/26

\* cited by examiner

US 11,518,331 B2

CHILD SAFETY SEAT

CROSS-REFERENCE TO RELATED APPLICATION(S)

This application claims priority to Chinese patent application no. 201910855970.2 filed on Sep. 10, 2019.

BACKGROUND

1. Field of the Invention

The present invention relates to child safety seats.

2. Description of the Related Art

A child safety seat is typically used in an automobile vehicle to properly restrain a child in the event of accidental collision. Generally, latches devices and a top tether may be respectively provided in the support base and at a top of the child seat for attaching the child safety seat on a vehicle. Moreover, the child safety seat may have an alert apparatus that can warn a caregiver when the latches devices and the top tether are incorrectly installed. For example, Chinese application publication no. CN 109177830 A discloses an alert apparatus that uses sensors for detecting the positions of the latches devices and top tether, and a signal processing unit that receives detection signals from the sensors and outputs a control signal to an alert emitter. Unfortunately, this construction is complex, may have a longer response time, and may be subjected to failure caused by damaged or faulty parts.

Therefore, there is a need for an improved child safety seat that is capable of alerting a caregiver when an improper installation occurs and address at least the foregoing issues.

SUMMARY

The present application describes a child safety seat having an alert system that is simple in construction and can effectively alert of an improper installation of the child safety seat on a vehicle seat.

According to one aspect, the child safety seat includes a first and a second restraining device, and an alert device and a first and a second switch serially connected in a series circuit. Each of the first and second restraining device is deployable to respectively engage with a corresponding structure provided in a vehicle for restraining the child safety seat, the second restraining device being operable independently of the first restraining device, and each of the first and second restraining device respectively having an idle position and a deployed position. The first switch is operatively coupled to the first restraining device and the second switch is operatively coupled to the second restraining device, each of the first and second switch respectively having an open state and a closed state. The first switch is in the closed state when the first restraining device is in the deployed position and the second switch is in the closed state when the second restraining device is in the idle position, whereby the alert device is activable to emit an alert signal when the first restraining device is in the deployed position and the second restraining device in the idle position.

DETAILED DESCRIPTION OF THE EMBODIMENTS

Figure 1:
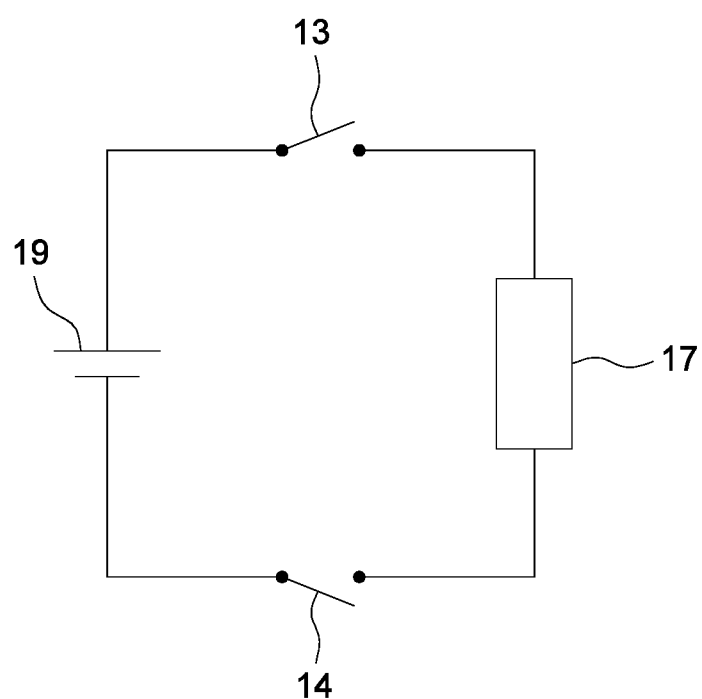
FIG. 1 is a circuit diagram illustrating an embodiment of an alert system for alerting of an improper installation of a child safety seat on a vehicle seat.

FIG. 1 is a circuit diagram illustrating an embodiment of an alert system 10 for alerting of an improper installation of a child safety seat on a vehicle seat. Referring to FIG. 1, the alert system 10 can include two switches 13 and 14 and an alert device 17 serially connected in a series circuit that can be powered with a power source 19. The switch 13 is operatively coupled to a first restraining device provided in a child safety seat, and the switch 14 is operatively coupled to a second restraining device provided in the child safety seat. Each of the first and second restraining device can include a movable part and can be independently operable between an idle position and a deployed position, wherein the first or second restraining device may be exemplarily retracted for facilitating storage in the idle position, and may be extended to a working position adapted to restrain the child safety seat on a vehicle seat in the deployed position.

The switch 13 has an OFF or open state and an ON or closed state, and each of the open state and the closed state of the switch 13 can uniquely correspond to one of the idle position and the deployed position of the first restraining device. According to an example of construction, the switch 13 can be open when the first restraining device is in the idle position, and can be closed when the first restraining device is in the deployed position.

Likewise, the switch 14 has an OFF or open state and an ON or closed state, and each of the open state and the closed state of the switch 14 can uniquely correspond to one of the idle position and the deployed position of the second restraining device. According to an example of construction, the switch 14 can be open when the second restraining device is in the deployed position, and can be closed when the second restraining device is in the idle position.

The alert device 17 is configured to emit an alert signal when it is activated by an electric current flowing through the switches 13 and 14 and the alert device 17. The alert signal emitted by the alert device 17 may include, without limitation, a sound, a light, or a combination thereof.

In the alert system 10, both the switches 13 and 14 are closed and an electric current can flow in the series circuit through the switches 13 and 14 and the alert device 17 when the first restraining device is in the deployed position and the second restraining device in the idle position, whereby the alert device 17 is activated to emit an alert signal warning a caregiver that the child safety seat is not properly installed. When the child safety seat is properly installed with both the first and second restraining devices in their respective deployed positions, the switch 13 is closed while the switch 14 is open so that no electric current flows through the alert device 17, which is consequently deactivated.

The first and second restraining devices coupled to the switches 13 and 14 can include any devices adapted to restrain and hold the child safety seat on a vehicle seat. Examples of the first and second restraining devices can include, without limitation, a latch device operable to releasably engage with an ISOFIX anchor provided in a vehicle, a top tether provided at an upper region of a backrest portion of the child safety seat that is attachable to a tether anchor provided in a vehicle at a back of a vehicle seat, a support leg deployable at a bottom of the child safety seat for contacting against a vehicle floor, or an extension part deployable from the child safety seat for contacting against a seatback of a vehicle seat.

Figure 5:
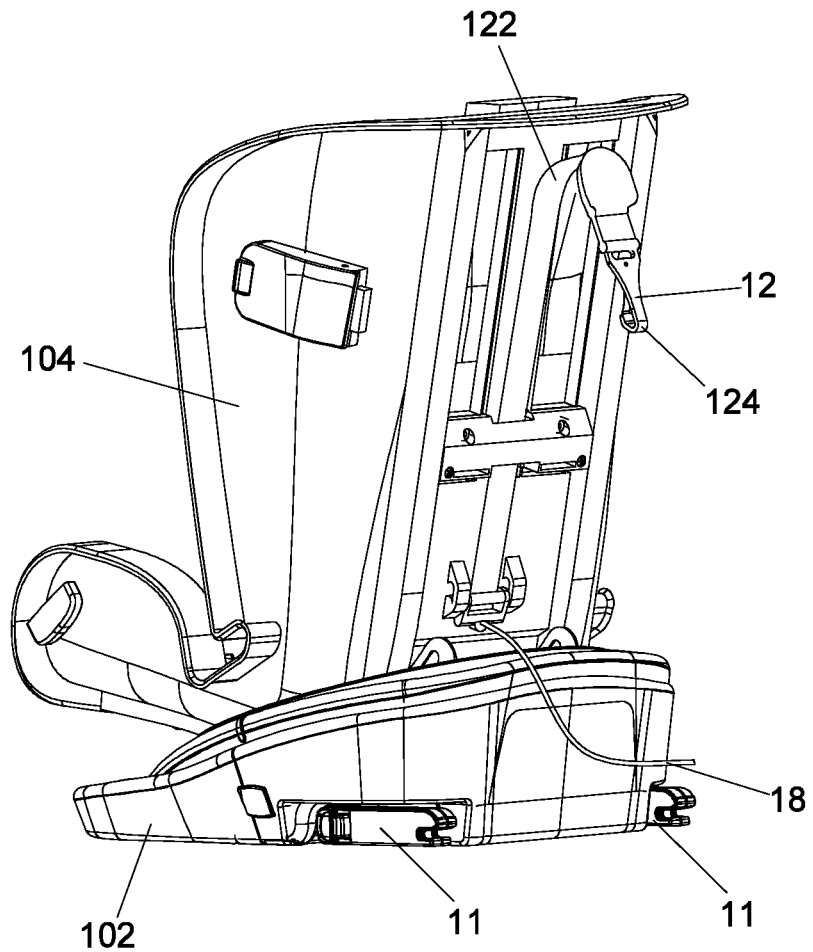
FIG. 5 is a perspective view illustrating some further construction details of the child safety seat shown in FIG. 2.
Figure 6:
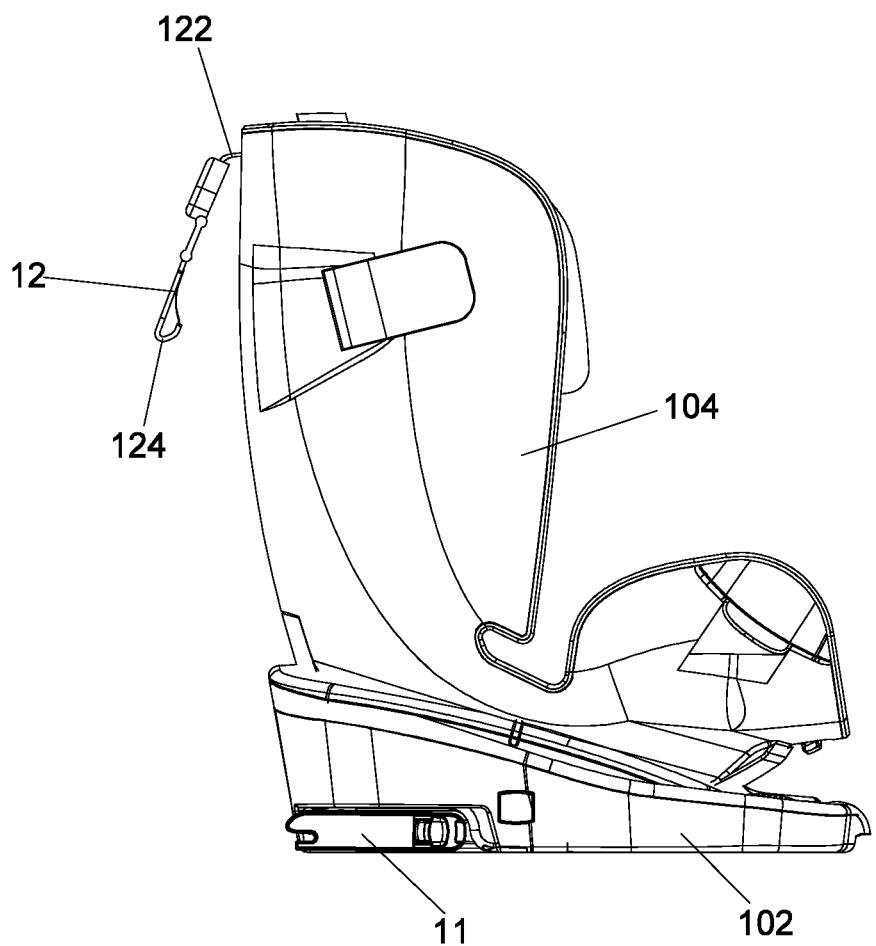
FIG. 6 is a side view illustrating the child safety seat shown in FIG. 2 having the restraining devices in their respective idle positions.
Figure 7:
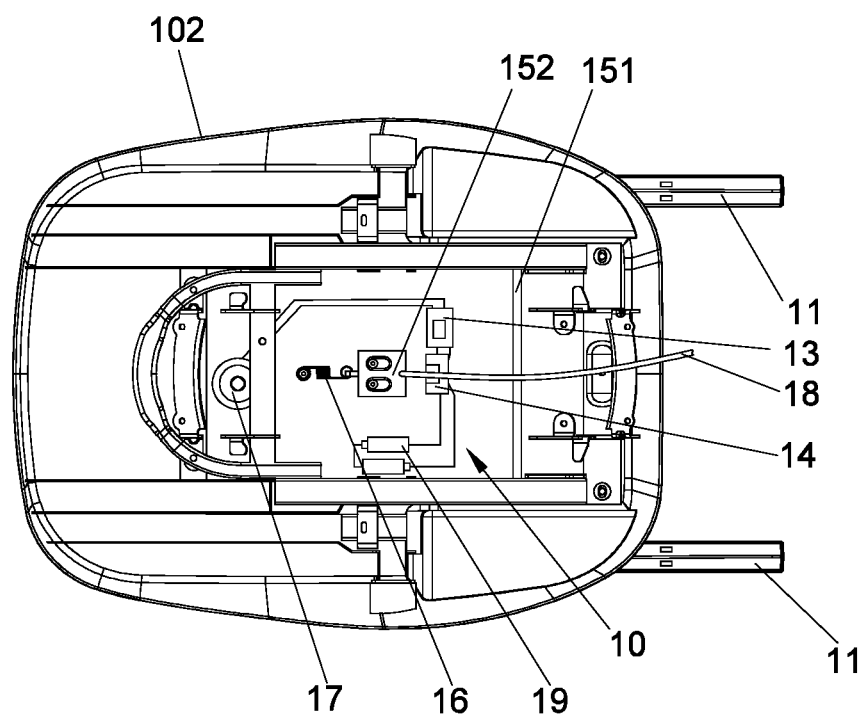
FIG. 7 is a schematic planar view illustrating an application of the alert system in the child safety seat of FIG. 1.

In conjunction with FIG. 1, FIGS. 2-6 are various perspective views illustrating an embodiment of a child safety seat 100, and FIG. 7 is a schematic planar view illustrating an application of the alert system 10 in the child safety seat 100. Referring to FIGS. 2-7, the child safety seat 100 can include a support base 102, a child seat 104, a plurality of restraining devices 11 and 12, and the alert system 10. The support base 102 is adapted to be installed on a vehicle seat, and can provide stable support for the child safety seat 100. The child seat 104 is placed on the support base 102, and can have a seat portion 104A and a backrest portion 104B.

Figure 2:
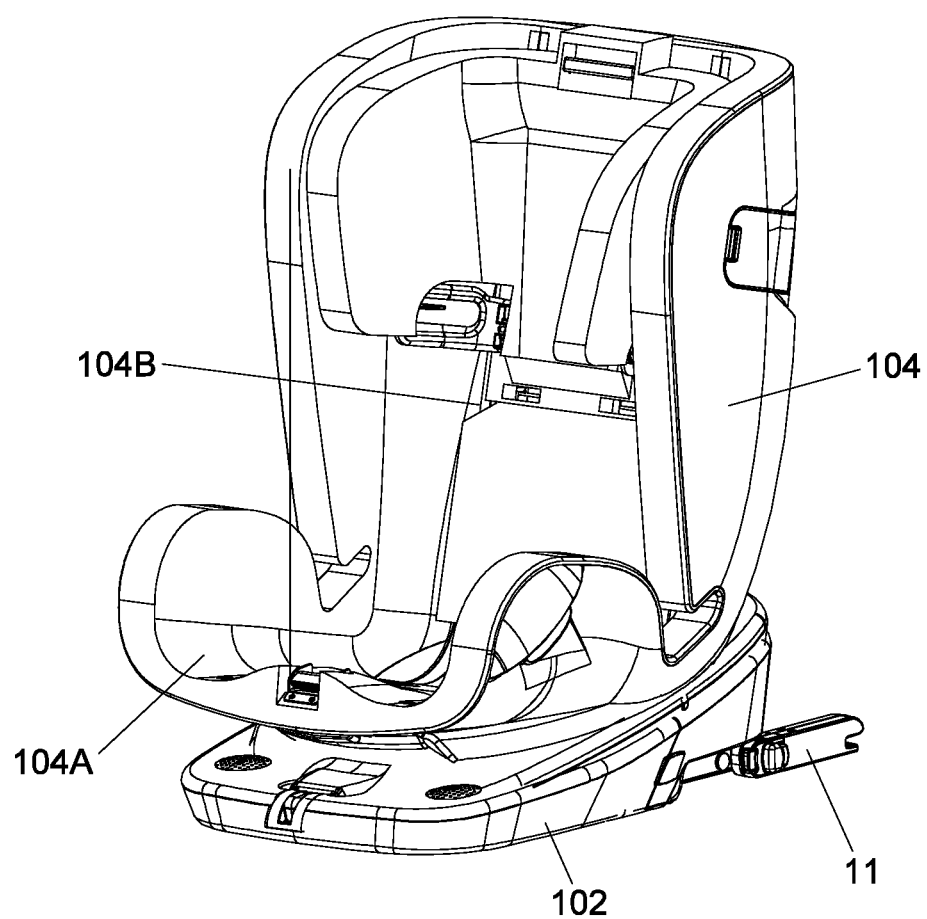
FIG. 2 is a perspective view illustrating an embodiment of a child safety seat that can incorporate the alert system.
Figure 3:
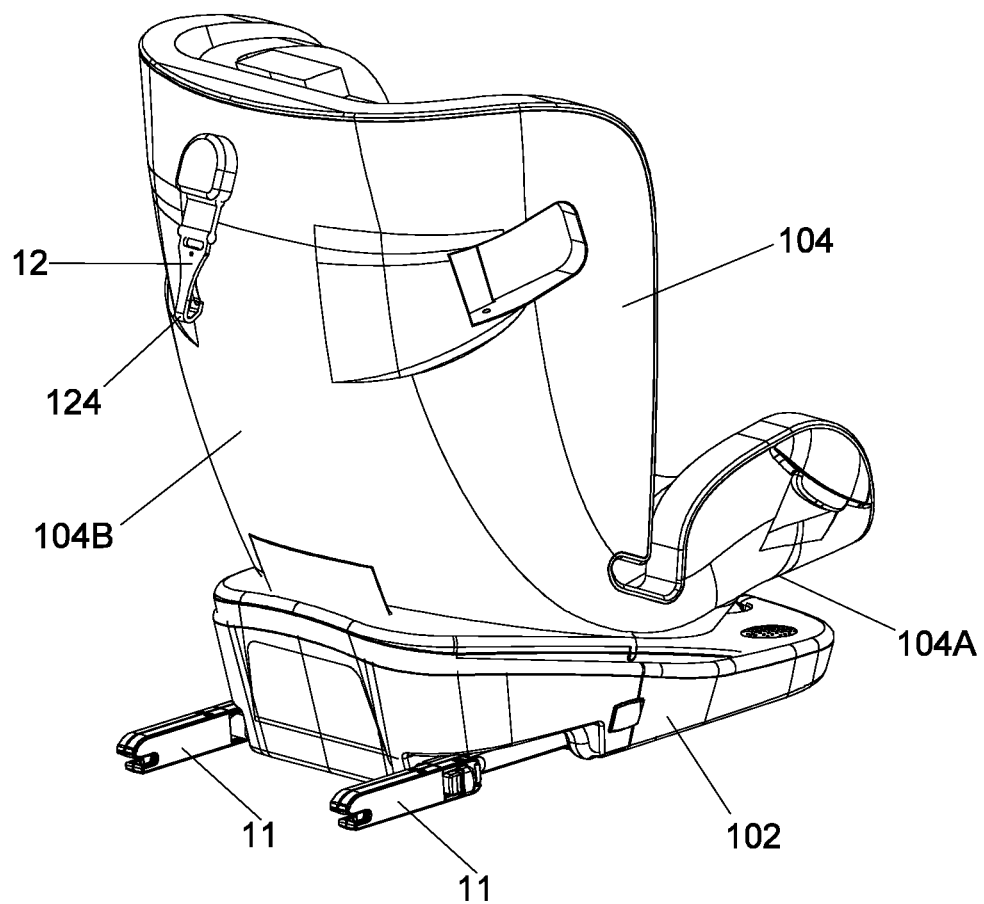
FIG. 3 is another perspective view illustrating the child safety seat shown in FIG. 2.
Figure 4:
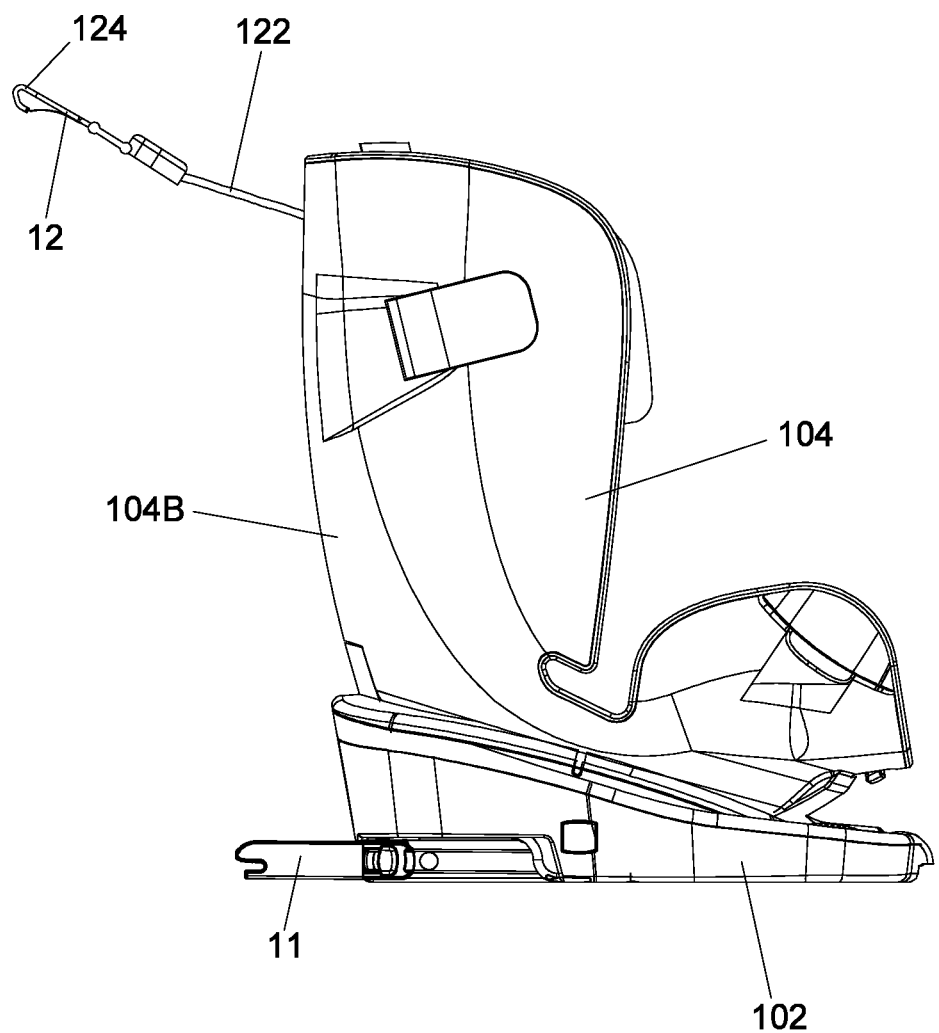
FIG. 4 is a side view illustrating the child safety seat shown in FIG. 2 having restraining devices in their respective deployed positions.

When the child safety seat 100 is installed on a vehicle seat, the restraining devices 11 and 12 can be deployed to engage with corresponding structures provided in the vehicle for restraining the child safety seat 100. According to an embodiment, two restraining devices 11 can be connected with the support base 102, and one restraining device 12 can be connected with the child seat 104, the restraining device 12 being operable independently of the two restraining devices 11. For example, the two restraining devices 11 can be latch devices operable to releasably engage with an anchor structure (e.g., ISOFIX anchor) provided in a vehicle near a lower end of a seatback of the vehicle seat. The two restraining devices 11 can move in unison relative to the support base 102 between a deployed position where the restraining devices 11 are extended away from an end of the support base 102 for engagement with the anchor structure provided in a vehicle, and an idle position where the restraining devices 11 are retracted and stowed adjacent to the support base 102. FIGS. 2-4 schematically illustrate the child safety seat 100 with the restraining devices 11 in the deployed position, and FIGS. 5 and 6 illustrate the child safety seat 100 with the restraining devices 11 in the idle position.

The restraining device 12 can be a top tether provided at an upper region of the backrest portion 104B that can attach to a tether anchor provided in a vehicle at a back of a vehicle seat. According to an example of construction, the restraining device 12 can include a strap 122 connected with the child seat 104, and a tether connector 124 provided at a free end of the strap 122. The restraining device 12 is movable relative to the child seat 104 between a deployed position where the strap 122 is extended at a top of the backrest portion 104B so that the tether connector 124 can engage with the tether anchor provided in the vehicle at the back of the vehicle seat, and an idle position where the strap 122 and the tether connector 124 can be stowed adjacent to the child seat 104. During accidental collision, the top tether can prevent the child safety seat 100 from pivoting forward, so that the child is less likely to impact the back of a front vehicle seat or a center console. FIG. 4 schematically illustrates the child safety seat 100 with the restraining device 12 in the deployed position, and FIG. 6 schematically illustrates the child safety seat 100 with the restraining device 12 in the idle position.

Referring to FIGS. 1-7, the alert system 10 can include the switches 13 and 14 and the alert device 17 serially connected in a series circuit that can be powered with the power source 19. The switches 13 and 14 and the alert device 17 may be disposed, e.g., in the support base 102 of the child safety seat 100. The switch 13 is operatively coupled to the restraining devices 11, and the switch 14 is operatively coupled to the restraining device 12. The switch 13 has an open state and a closed state, and each of the open state and the closed state of the switch 13 can uniquely correspond to one of the idle position and the deployed position of the restraining devices 11. According to an example of construction, the switch 13 is open when the restraining devices 11 are in the idle position, and is closed when the restraining devices 11 are in the deployed position. The switch 14 has an open state and a closed state, and each of the open state and the closed state of the switch 14 can uniquely correspond to one of the idle position and the deployed position of the restraining device 12. According to an example of construction, the switch 14 is open when the restraining device 12 is in the deployed position, and is closed when the restraining device 12 is in the idle position.

According to an example of construction, the switch 13 can be a biased switch. For example, the switch 13 can be biased to the closed state when no external force is applied thereon, and the alert system 10 can include a switching actuator 151 connected with the restraining devices 11, wherein the switching actuator 151 is movable away from or toward the switch 13 as the restraining devices 11 move between the deployed position and the idle position to cause the switch 13 to turn between the open state and the closed state. According to an example of construction, the switching actuator 151 can include a bar fixedly connected with the two restraining devices 11 that extends transversally relative to the support base 102. The switching actuator 151 can thereby move in unison with the restraining devices 11 between the deployed position and the idle position.

Figure 9:
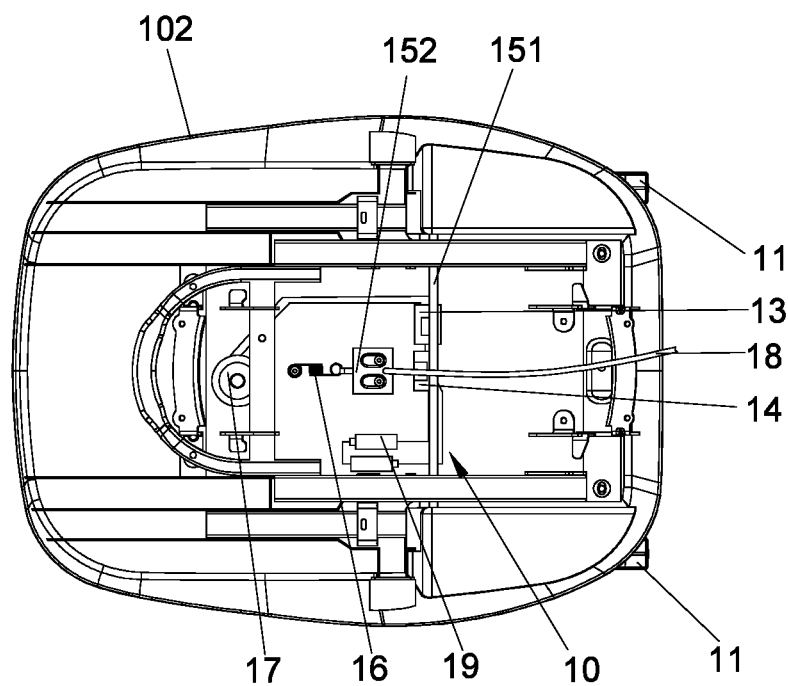

Referring to FIG. 7, when the restraining devices 11 are in the deployed position, the switching actuator 151 is spaced apart from the switch 13 so that no external force is applied by the switching actuator 151 on the switch 13, whereby the switch 13 remains in the closed state. When the restraining devices 11 are displaced from the deployed position to the idle position, the switching actuator 151 is moved toward and contacts with the switch 13, whereby the switch 13 is urged by the switching actuator 151 to turn from the closed state to the open state. When the restraining devices 11 move from the idle position to the deployed position, the switching actuator 151 is moved away out of contact with the switch 13, which can consequently recover the closed state. FIG. 7 illustrates the restraining devices 11 and the switching actuator 151 in a configuration corresponding to the deployed position, and FIG. 9 illustrates the restraining devices 11 and the switching actuator 151 in a configuration corresponding to the idle position.

According to an example of construction, the switch 14 can also be a biased switch. For example, the switch 14 can be biased to the closed state when no external force is applied thereon, and the alert system 10 can include a switching actuator 152 connected with the restraining device 12, wherein the switching actuator 152 is movable away from or toward the switch 14 as the restraining device 12 moves between the deployed position and the idle position to cause the switch 14 to turn between the closed state and the open state. According to an example of construction, the restraining device 12 can be connected with the switching actuator 152 via a linking part 18, whereby the switching actuator 152 can be driven in movement by a displacement of the restraining device 12 between the idle position and the deployed position. According to an example of construction, the switching actuator 152 can be a sliding part assembled with the support base 102 or the child seat 104. According to another example of construction, the switching actuator 152 may be a rotary part assembled with the support base 102 or the child seat 104. The linking part 18 can include a cable or flexible strip having one end affixed to the restraining device 12 (e.g., the strap 122 thereof) and another end affixed to the switching actuator 152 inside the support base 102. Moreover, the switching actuator 152 can be connected with a spring 16, which biases the switching actuator 152 away from the switch 14. According to an example of construction, the switching actuator 152 may be disposed inside the support base 102, and the spring 16 can have two ends respectively affixed to the switching actuator 152 and the support base 102.

Figure 8:
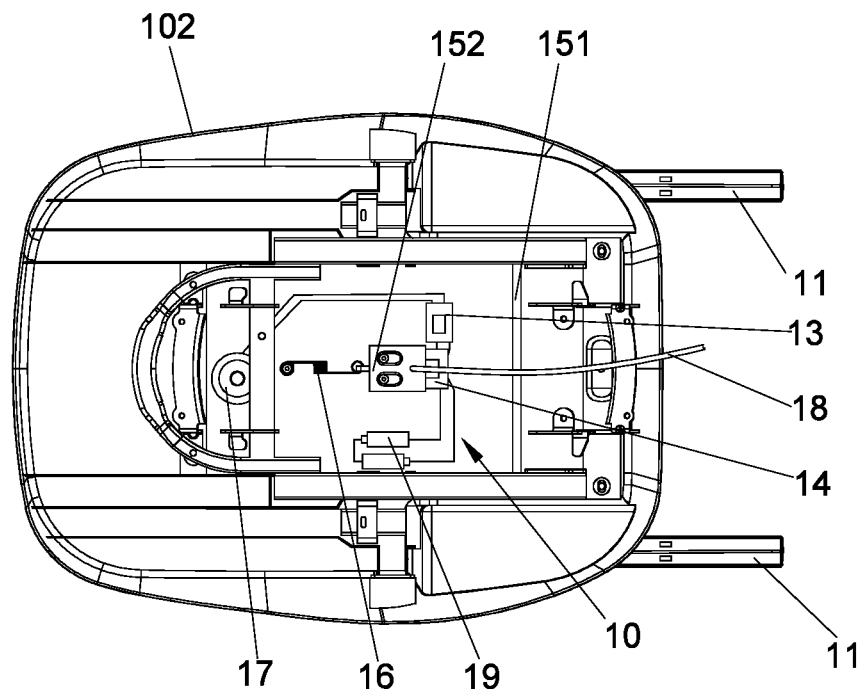
FIGS. 8 and 9 are two schematic planar views illustrating the alert system of FIG. 7 in two different configurations corresponding to different idle and deployed positions of the restraining devices provided in the child safety seat.

Referring to FIGS. 2-7, when the restraining device 12 is in the idle position, the switching actuator 152 is spaced apart from the switch 14 so that no external force is applied by the switching actuator 152 on the switch 14, whereby the switch 14 remains in the closed state. When the restraining device 12 is displaced from the idle position to the deployed position, the switching actuator 152 is moved toward and contacts with the switch 14, whereby the switch 14 is urged by the switching actuator 152 to turn from the closed state to the open state. The switching actuator 152 can be moved toward the switch 14 via a pulling action applied by the restraining device 12 through the linking part 18. When the restraining device 12 moves from the deployed position to the idle position, the spring 16 can urge the switching actuator 152 to move away out of contact with the switch 14 so that the switch 14 can recover the closed state. FIG. 7 illustrates the switching actuator 152 in a configuration corresponding to the idle position of the restraining device 12, and FIG. 8 illustrates the switching actuator 152 in a configuration corresponding to the deployed position of the restraining device 12.

Referring to FIG. 7, the power source 19 can include one or more battery cells. According to an example of construction, the power source 19 can be provided in the child safety seat 100, e.g., in the support base 102 or the child seat 104 of the child safety seat 100. According to another construction, the power source 19 may be provided in the form of an external power source that may be electrically connected or disconnected from the electric circuit of the alert system 10.

The alert device 17 is configured to emit an alert signal when it is activated by an electric current flowing through the switches 13 and 14 and the alert device 17. The alert signal emitted by the alert device 17 may include, without limitation, a sound, a light, or a combination thereof.

Exemplary operation of the alert system 10 is described hereinafter with reference to FIGS. 1-9. Referring to FIGS. 5, 6 and 9, the restraining devices 11 are in the idle position, and the switching actuator 151 is positioned in contact with the switch 13 so that the switch 13 is kept in the open state. The restraining device 12 is also in the idle position, and the switching actuator 152 is spaced apart from the switch 14 so that the switch 14 remains in the closed state. As a result, the electric circuit comprised of the serially connected switches 13 and 14 and alert device 17 is open, and no electric current flows through the alert device 17. The alert device 17 thus does not emit any alert signal when the restraining devices 11 and 12 are in their respective idle positions.

Referring to FIGS. 3 and 7, while the restraining device 12 remains in the idle position and the switch 14 in the closed state, the restraining devices 11 can be moved from the idle position to the deployed position, which displaces the switching actuator 151 away from the switch 13. This movement of the restraining devices 11 to the deployed position can take place when the child safety seat 100 is installed on a vehicle seat. As the switching actuator 151 moves out of contact with the switch 13, the switch 13 can turn from the open state to the closed state. Since both the switches 13 and 14 are in the closed state, the electric circuit comprised of the serially connected switches 13 and 14 and alert device 17 is closed, and an electric current can flow in the series circuit from the power source 19 through the switches 13 and 14 and the alert device 17. As a result, the alert device 17 is activated and emits an alert signal warning that the child safety seat 100 is not properly installed due to the restraining device 12 still being in the idle position.

Referring to FIGS. 4 and 8, while the restraining devices 11 remain in the deployed position and the switch 13 in the closed state, the restraining device 12 can be extended from the idle position to the deployed position, which pulls the switching actuator 152 in movement toward the switch 14 against the biasing action of the spring 16. The switching actuator 152 can thereby contact and urge the switch 14 to turn from the closed state to the open state. As a result, the electric circuit comprised of the switches 13 and 14 and the alert device 17 is open, and no electric current flows through the alert device 17. The alert device 17 thus stops emitting the alert signal when the restraining devices 11 and 12 are in their respective deployed positions.

The aforementioned embodiment describes an example in which the switch 13 can be turned between the open state and the closed state via a contact between the switching actuator 151 and the switch 13, and the switch 14 can be turned between the open state and the closed state via a contact between the switching actuator 152 and the switch 14. It will be appreciated, however, that other mechanisms requiring no contact may be applicable for turning the switch 13 or 14 between the open state and the closed state. For example, a variant construction can incorporate a sensor in the switch 13 that is capable of sensing a proximity of the switching actuator 151, whereby the switch 13 can be open when a distance between the switching actuator 151 and the switch 13 is smaller than a reference value and closed when the distance between the switching actuator 151 and the switch 13 is greater than the reference value. Likewise, a variant construction can incorporate a sensor in the switch 14 that is capable of sensing a proximity of the switching actuator 152, whereby the switch 14 can be open when a distance between the switching actuator 152 and the switch 14 is smaller than a reference value and closed when the distance between the switching actuator 152 and the switch 14 is greater than the reference value.

In the aforementioned examples of construction, the switch 13 is closed when the switching actuator 151 is spaced apart from the switch 13 and open when the switching actuator 151 contacts with or is proximate to the switch 13, and the switch 14 is closed when the switching actuator 152 is spaced apart from the switch 14 and open when the switching actuator 152 contacts with or is proximate to the switch 14. It will be appreciated, however, that the configuration of the switch 13 and the switching actuator 151 may be modified so that the switch 13 is closed (i.e., corresponding to the deployed position of the restraining devices 11) when the switching actuator 151 contacts with or is proximate to the switch 13 and open (i.e., corresponding to the idle position of the restraining devices 11) when the switching actuator 151 is spaced apart from the switch 13. Likewise, the configuration of the switch 14 and the switching actuator 152 may be modified so that the switch 14 is closed (i.e., corresponding to the idle position of the restraining device 12) when the switching actuator 152 contacts with or is proximate to the switch 14 and open (i.e., corresponding to the deployed position of the restraining device 12) when the switching actuator 152 is spaced apart from the switch 14.

Figure 10:
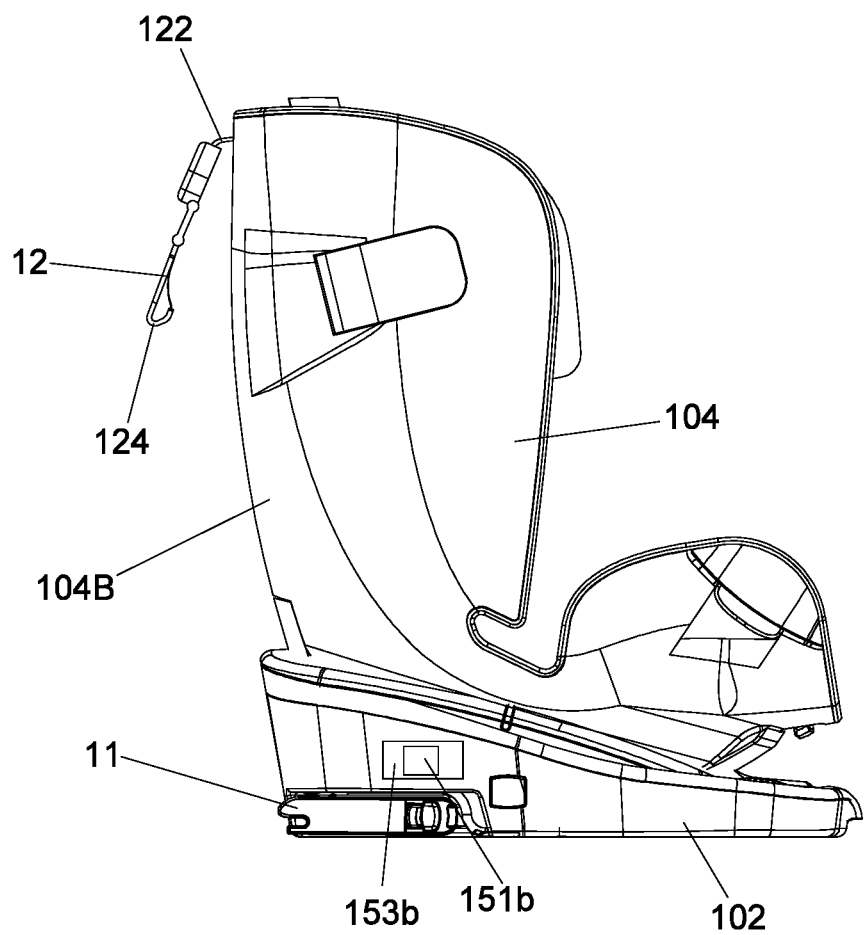
FIG. 10 is a side view illustrating the child safety seat incorporating a variant construction of the alert system.
Figure 11:
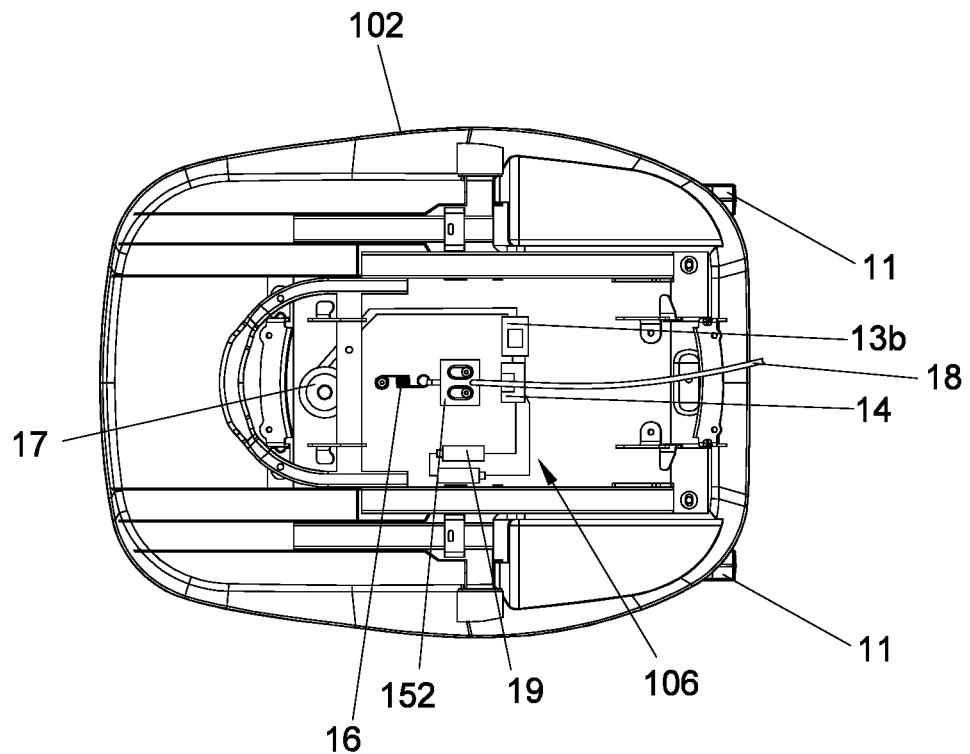
FIG. 11 is a schematic planar view illustrating further construction details of the alert system provided in the child safety seat of FIG. 10.

FIGS. 10 and 11 are respectively a side view and a schematic planar view illustrating a variant construction of an alert system 10b applied in the child safety seat 100. Referring to FIGS. 10 and 11, the alert system 10b can be similar to the alert system 10 described previously, except that the switch 13 and the switching actuator 151 in the alert system 10 are replaced with a switch 13b, a sensor 151b and a control signal emitter 153b in the alert system 10b. Like in the previous embodiments, the switches 13b and 14 and the alert device 17 are serially connected in a series circuit that can be powered with the power source 19, the switch 13b is operatively coupled to the restraining devices 11 so that each of the open state and the closed state of the switch 13b can uniquely correspond to one of the idle position and the deployed position of the restraining devices 11 (e.g., the open state corresponding to the idle position and the closed state corresponding to the deployed position), and the switch 14 is operatively coupled to the restraining device 12 so that each of the open state and the closed state of the switch 14 can uniquely correspond to one of the idle position and the deployed position of the restraining device 12 (e.g., the open state corresponding to the deployed position and the closed state corresponding to the idle position). A difference of the alert system 10b is that the switch 13b is an electronic switch that can be controlled with the sensor 151b and the control signal emitter 153b. According to an example of construction, the sensor 151b can be assembled with the support base 102, and the control signal emitter 153b can be respectively connected electrically with the switch 13b and the sensor 151b. The sensor 151b can be configured to detect a position of the restraining devices 11, e.g., whether the restraining devices 11 are in the idle position or the deployed position, and can correspondingly send a detection signal to the control signal emitter 153b. According to an example of construction, the sensor 151b can be assembled with the support base 102 at a location adjacent to one of the two restraining devices 11 for detecting whether the restraining devices 11 are in the idle position or the deployed position.

According to the detection signal received from the sensor 151b, the control signal emitter 153b can output a control signal that turns the switch 13b between the open state and the closed state. Like in the alert system 10, the switch 13b of the alert system 10b is open when the restraining devices 11 are in the idle position, and is closed when the restraining devices 11 are in the deployed position.

Exemplary operation of the alert system 10b is described hereinafter with reference to FIGS. 10 and 11. Referring to FIGS. 10 and 11, when the restraining devices 11 and 12 are in their respective idle positions, the switch 13b is in the open state and the switch 14 is in the closed state. The open state of the switch 13b can be set, e.g., by the absence or application of a control signal outputted by the control signal emitter 153b in accordance with the detection by the sensor 151b that the restraining devices 11 are in the idle position. The closed state of the switch 14 can be set by the position of the switching actuator 152 that is spaced apart from the switch 14 when the restraining device 12 is in the idle position, like previously described. As a result, the electric circuit comprised of the serially connected switches 13b and 14 and alert device 17 is open, and no electric current flows through the alert device 17. The alert device 17 thus does not emit any alert signal when the restraining devices 11 and 12 are in their respective idle positions.

While the restraining device 12 remains in the idle position and the switch 14 in the closed state, the restraining devices 11 can be moved from the idle position to the deployed position (e.g., when the child safety seat 100 is installed on a vehicle seat), which can be detected by the sensor 151b. In accordance with the detection signal received from the sensor 151b, the control signal emitter 153b can output a control signal to the switch 13b that causes the switch 13b to turn from the open state to the closed state. Since both the switches 13b and 14 are in the closed state, the electric circuit comprised of the serially connected switches 13b and 14 and alert device 17 is closed, and an electric current can flow in the series circuit from the power source 19 through the switches 13b and 14 and the alert device 17. As a result, the alert device 17 is activated and emits an alert signal warning that the child safety seat 100 is not properly installed due to the restraining device 12 still being in the idle position.

While the restraining devices 11 remain in the deployed position and the switch 13b in the closed state, the restraining device 12 can be extended from the idle position to the deployed position, which pulls the switching actuator 152 in movement toward the switch 14 like previously described. The switching actuator 152 can thereby contact with or be positioned proximate to the switch 14, which can cause the switch 14 to turn from the closed state to the open state. As a result, the series circuit comprised of the switches 13b and 14 and the alert device 17 is open, and no electric current flows through the alert device 17. The alert device 17 thus stops emitting the alert signal when the restraining devices 11 and 12 are in their respective deployed positions.

Figure 12:
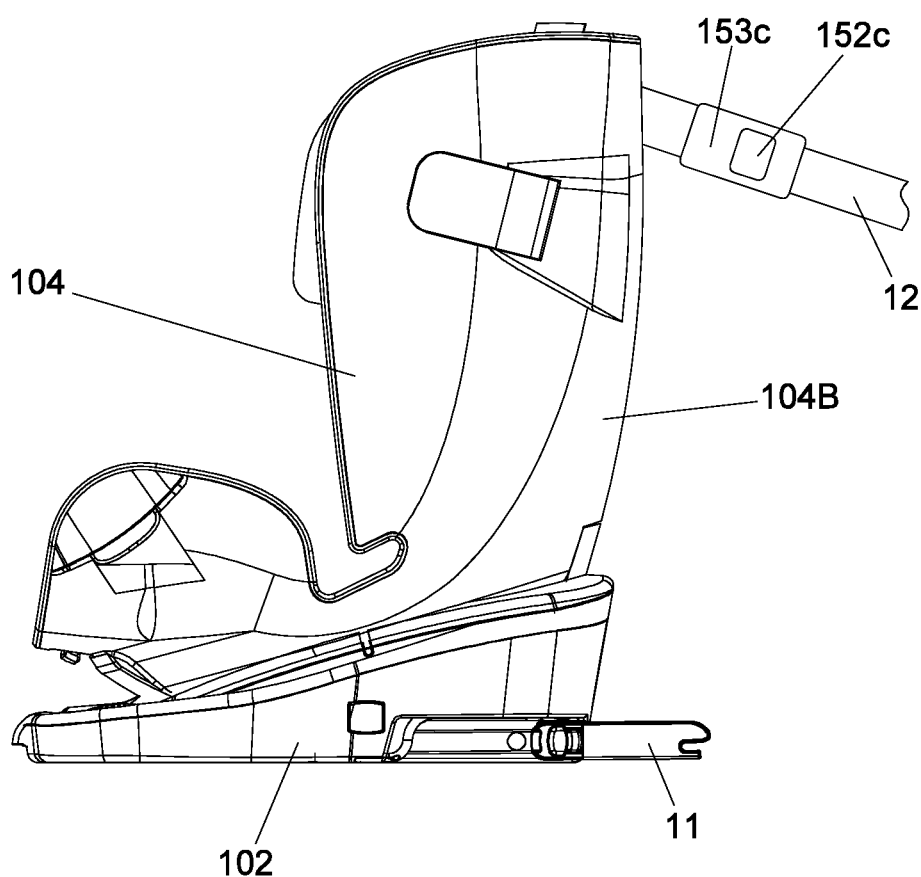
FIG. 12 is a side view illustrating the child safety seat incorporating another variant construction of the alert system.
Figure 13:
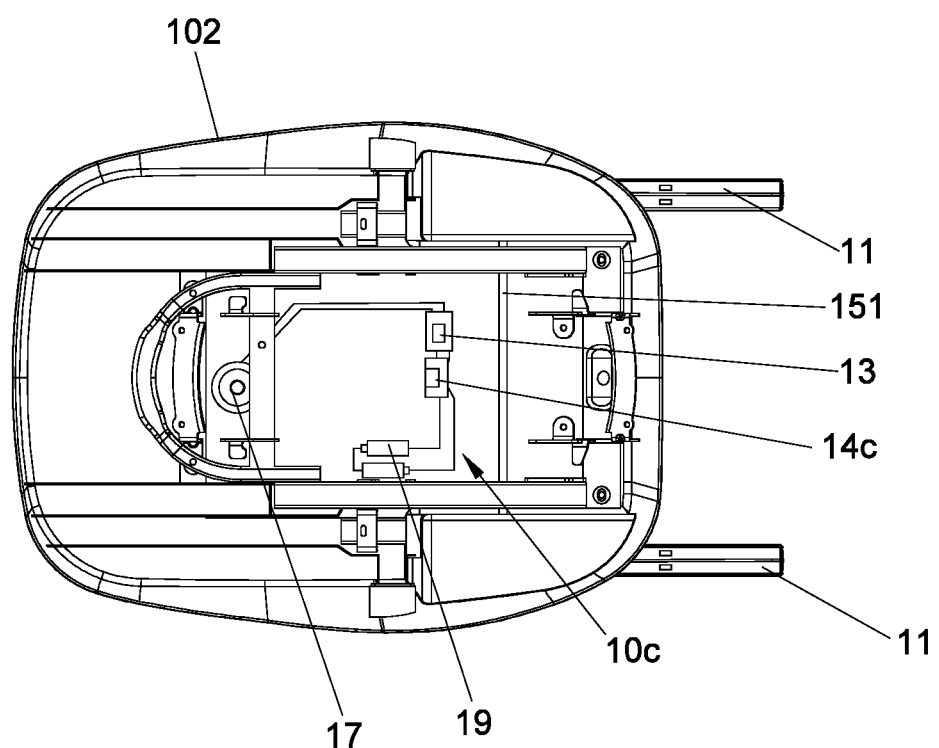
FIG. 13 is a schematic planar view illustrating further construction details of the alert system provided in the child safety seat of FIG. 12.

FIGS. 12 and 13 are respectively a side view and a planar view illustrating a variant construction of an alert system 10c applied in the child safety seat 100. Referring to FIGS. 12 and 13, the alert system 10c can be similar to the alert system 10 described previously, except that the switch 14 and the switching actuator 152 in the alert system 10 are replaced with a switch 14c, a sensor 152c and a control signal emitter 153c in the alert system 10c Like in the previous embodiment, the switches 13 and 14c and the alert device 17 are serially connected in a series circuit that can be powered with the power source 19, the switch 13 is operatively coupled to the restraining devices 11 so that each of the open state and the closed state of the switch 13 can uniquely correspond to one of the idle position and the deployed position of the restraining devices 11 (e.g., the open state corresponding to the idle position and the closed state corresponding to the deployed position), and the switch 14c operatively coupled to the restraining device 12 so that each of the open state and the closed state of the switch 14c can uniquely correspond to one of the idle position and the deployed position of the restraining device 12 (e.g., the open state corresponding to the deployed position and the closed state corresponding to the idle position). A difference of the alert system 10c is that the switch 14c is an electronic switch that can be controlled with the sensor 152c and the control signal emitter 153c. According to an example of construction, the control signal emitter 153c can be respectively connected electrically with the switch 14c and the sensor 152c. The sensor 152c is configured to detect whether the restraining device 12 is in the idle position or the deployed position, and can correspondingly send a detection signal to the control signal emitter 153c. According to an example of construction, the sensor 152c may be assembled with the restraining device 12, e.g., adjacent to the strap 122 thereof.

According to the detection signal received from the sensor 152c, the control signal emitter 153c can output a control signal that turns the switch 14c between the open state and the closed state. Like in the alert system 10, the switch 14c of the alert system 10c is closed when the restraining device 12 is in the idle position, and is open when the restraining device 12 is in the deployed position.

Exemplary operation of the alert system 10c is described hereinafter with reference to FIGS. 12 and 13. Referring to FIGS. 12 and 13, when the restraining devices 11 and 12 are in their respective idle positions, the switch 13 is in the open state and the switch 14c is in the closed state. The open state of the switch 13 can be set by the position of the switching actuator 151 in contact with or proximate to the switch 13 when the restraining devices 11 are in the idle position, like previously described. The closed state of the switch 14c can be set, e.g., by a control signal outputted by the control signal emitter 153c in accordance with the detection by the sensor 152c that the restraining device 12 is in the idle position. As a result, the electric circuit comprised of the serially connected switches 13 and 14c and alert device 17 is open, and no electric current flows through the alert device 17. The alert device 17 thus does not emit any alert signal when the restraining devices 11 and 12 are in their respective idle positions.

While the restraining device 12 remains in the idle position and the switch 14c in the closed state, the restraining devices 11 can be moved from the idle position to the deployed position (e.g., when the child safety seat 100 is installed on a vehicle seat), which can move the switching actuator 151 away and out of contact with the switch 13 and thereby cause the switch 13 to turn from the open state to the closed state. Since both the switches 13 and 14c are in the closed state, the electric circuit comprised of the serially connected switches 13 and 14c and alert device 17 is closed, and an electric current can flow in the series circuit from the power source 19 through the switches 13 and 14c and the alert device 17. As a result, the alert device 17 is activated and emits an alert signal warning that the child safety seat 100 is not properly installed due to the restraining device 12 still being in the idle position.

While the restraining devices 11 remain in the deployed position and the switch 13 in the closed state, the restraining device 12 can be extended from the idle position to the deployed position, which can be detected by the sensor 152c. In accordance with the detection signal received from the sensor 152c, the control signal emitter 153c can output a control signal to the switch 14c that causes the switch 14c to turn from the closed state to the open state. As a result, the electric circuit comprised of the switches 13 and 14c and the alert device 17 is open, and no electric current flows through the alert device 17. The alert device 17 thus stops emitting the alert signal when the restraining devices 11 and 12 are in their respective deployed positions.

In the aforementioned illustration where the restraining devices 11 are ISOFIX latch devices and the restraining device 12 is a top tether, the alert system can provide an alert with respect to an improper installation where the restraining devices 11 are in the deployed position and the restraining device 12 in the idle position, which is a likely situation as caregivers may omit the installation of the top tether in practice. It will be appreciated, however, that the alert systems described herein may also be configured to issue an alert when the restraining device 12 is in the deployed position and the restraining devices 11 in the idle position by simply changing the setting of the switches in the alert system. In that case, the switch associated with the restraining device 12 would be closed when the restraining device 12 is in the deployed position and open when the restraining device 12 is in the idle position, and the switch associated with the restraining devices 11 would be closed when the restraining devices 11 are in the idle position and open when the restraining devices 11 are in the deployed position.

Although the aforementioned embodiments describe a child safety seat in which the restraining devices 11 and 12 include ISOFIX latch devices and a top tether, it will be appreciated that the alert systems described herein may be applicable for detecting an improper installation of other restraining devices provided in a child safety seat. For example, other embodiments may have any of the switches 13, 13b, 14 and 14c operatively coupled to a support leg deployable at a bottom of the child safety seat for contacting against a vehicle floor, or to an extension part deployable from the child safety seat for contacting against a seatback of a vehicle seat.

Correspondingly, various mechanisms may be adapted to turn the switches of the alert system between the closed state and the open state depending on the restraining devices operatively coupled thereto. In an example where one of the restraining devices is the support leg deployable at a bottom of the child safety seat, a linking structure may connect a movable articulation of the support leg with the switching actuator 151 or 152 so that the switch associated therewith can be open or closed as the support leg moves between the idle state and the deployed state. According to another example where one of the restraining devices is the support leg or the extension part deployable for contacting against a seatback of a vehicle seat, the linking structure connecting with the switching actuator 151 or 152 may include a movable part provided at an end of the support leg or extension part that can be displaced as it contacts with an external environment (e.g., the vehicle floor or the seatback of the vehicle seat) in the deployed position and can recover an initial position owing to a spring force in the idle position.

According to yet another example where one of the restraining devices is the support leg or the extension part, an end of the support leg or the extension part may have a sensor (e.g., a pressure sensor or an infrared distance sensor) that can detect the deployed position and accordingly output a detection signal so that the switch 13b or 14c associated therewith can be turned between the open state and the closed state.

Advantages of the structures described herein include the ability to provide alert systems that are simple in construction and operation and can effectively assist a caregiver in properly installing a child safety seat on a vehicle seat.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a first and a second restraining device deployable to respectively engage with corresponding structures provided in a vehicle for restraining the child safety seat, the second restraining device being operable independently of the first restraining device, each of the first and second restraining device respectively having an idle position and a deployed position; and
   an alert device and a first and a second switch serially connected in a series circuit, the first switch being operatively coupled to the first restraining device and the second switch being operatively coupled to the second restraining device, each of the first and second switch respectively having an open state and a closed state;
   wherein the first switch is in the closed state when the first restraining device is in the deployed position and the second switch is in the closed state when the second restraining device is in the idle position, whereby the alert device is activable to emit an alert signal when the first restraining device is in the deployed position and the second restraining device in the idle position.

2. The child safety seat according to claim 1, wherein each of the open state and the closed state of the first switch uniquely corresponds to one of the idle position and the deployed position of the first restraining device, and each of the open state and the closed state of the second switch uniquely corresponds to one of the idle position and the deployed position of the second restraining device.

3. The child safety seat according to claim 1, wherein any of the first and second switches includes a biased switch.

4. The child safety seat according to claim 1, wherein the first restraining device is connected with a switching actuator, the switching actuator being movable away from or toward the first switch as the first restraining device moves between the idle position and the deployed position to cause the first switch to turn between an open state and a closed state.

5. The child safety seat according to claim 4, wherein the switching actuator is spaced apart from the first switch so that the first switch remains closed when the first restraining device is in the deployed position, and the switching actuator contacts with or is proximate to the first switch so that the first switch is open when the first restraining device is moved to the idle position.

6. The child safety seat according to claim 4, wherein the switching actuator is fixedly connected with the first restraining device.

7. The child safety seat according to claim 6, wherein the switching actuator includes a bar fixedly connected with the first restraining device.

8. The child safety seat according to claim 1, wherein the second restraining device is connected with a switching actuator, the switching actuator being movable away from or toward the second switch as the second restraining device moves between the idle position and the deployed position to cause the second switch to turn between an open state and a closed state.

9. The child safety seat according to claim 8, wherein the switching actuator is spaced apart from the second switch so that the second switch remains closed when the second restraining device is in the idle position, and the switching actuator contacts with or is proximate to the second switch so that the second switch is open when the second restraining device is moved to the deployed position.

10. The child safety seat according to claim 8, wherein the second restraining device is connected with the switching actuator via a linking part.

11. The child safety seat according to claim 10, wherein the linking part is a cable or flexible strip.

12. The child safety seat according to claim 8, wherein the switching actuator is further connected with a spring configured to bias the switching actuator away from the second switch.

13. The child safety seat according to claim 1, further including a sensor and a control signal emitter, the sensor being configured to detect whether one of the first and second restraining device is in the idle position or the deployed position, and the control signal emitter being operable to output a control signal that turns the first or second switch between an open state and a closed state according to a detection signal received from the sensor.

14. The child safety seat according to claim 13, wherein the sensor is assembled with a support base of the child safety seat at a location adjacent to the first restraining device for detecting whether the first restraining device is in the idle position or the deployed position, or is assembled with the second restraining device for detecting whether the second restraining device is in the idle position or the deployed position.

15. The child safety seat according to claim 1, including a support base, and a child seat having a backrest portion, the first restraining device being connected with the support base, and the second restraining device is connected with the child seat and is extendible at a top of the backrest portion.

16. The child safety seat according to claim 1, wherein any of the first and second restraining devices includes a latch device operable to engage with an ISOFIX anchor provided in a vehicle, or a top tether provided at an upper region of a backrest portion of the child safety seat.

17. The child safety seat according to claim 1, wherein the alert signal includes a sound, a light, or a combination thereof.

* * * * *